United States Patent [19]

Takami

[11] Patent Number: 4,765,195
[45] Date of Patent: Aug. 23, 1988

[54] STEPLESS TRANSMISSION MECHANISM

[75] Inventor: Akira Takami, Himeji, Japan

[73] Assignee: Mitsubishi Denki Kabushiki Kaisha, Tokyo, Japan

[21] Appl. No.: 50,125

[22] Filed: May 15, 1987

[30] Foreign Application Priority Data

| May 15, 1986 | [JP] | Japan | 61-113005 |
| Aug. 18, 1986 | [JP] | Japan | 61-193104 |
| Sep. 16, 1986 | [JP] | Japan | 61-218573 |

[51] Int. Cl.$^4$ ............................................. F16H 3/42
[52] U.S. Cl. ................................... 74/113; 74/125.5; 74/793; 74/63; 74/393; 74/437
[58] Field of Search ............. 74/63, 113, 125.5, 793, 74/380, 384, 393, 394, 437

[56] References Cited

U.S. PATENT DOCUMENTS

| 1,409,900 | 3/1922 | Adams | 74/394 |
| 1,807,889 | 6/1931 | Belin | 74/393 |
| 2,239,313 | 4/1941 | Beschkine | 74/437 |
| 2,933,940 | 4/1960 | Hallden | 74/437 |
| 3,424,021 | 1/1969 | Freudenstein | 74/437 |
| 3,605,515 | 9/1971 | Lecavelier et al. | 74/437 |
| 3,919,895 | 11/1975 | Kerr | 74/394 |
| 4,055,091 | 10/1977 | Kerr | 74/394 |
| 4,685,348 | 8/1987 | Takami | 74/437 |

FOREIGN PATENT DOCUMENTS

| 206032 | 1/1957 | Australia | 74/437 |
| 641692 | 8/1950 | United Kingdom | 74/393 |
| 502159 | 4/1976 | U.S.S.R. | 74/437 |

Primary Examiner—Lawrence Staab
Attorney, Agent, or Firm—Sughrue, Mion, Zinn, Macpeak and Seas

[57] ABSTRACT

A stepless transmission of the non-friction type is provided using intermeshing non-circular gears. The transmission is made up of a number of angular velocity modulators each having first, second, and third shafts. Each shaft carries a non-circular gear thereon which meshes with the gear of a succeeding shaft. The angular velocity ratio $\omega$ of the third shaft of each modulator relative to the first shaft depends on the pitch curve of the intermeshing non-circular gears and on the position of the third shaft relative to the position of the first and second shafts. By changing the position of the third shaft the angular velocity ratio $\omega$ of the modulator can be steplessly varied. The output of the third shafts of each modulator are combined onto a common shaft by one the clutches to provide a continuous output. The position of the third shafts, and thus the overall ratio of the transmission, may be controlled automatically by a spring.

8 Claims, 24 Drawing Sheets

FIRST NON-CIRCULAR GEAR ANGLE DEVIATION θ (Rad.)

STEPLESS TRANSMISSION MECHANISM

BACKGROUND OF THE INVENTION

The present invention relates to an angular velocity modulating device having elemental units each including mechanical gear means for obtaining an automatic stepless transmission mechanism usable in power drive means generally.

A typical example of a conventional mechanical automatic transmission mechanism using gears is disclosed in Japanese Patent Publication No. 42181/1984, construction of which is used in this application as FIG. 1 to show the state of art, in which a reference numeral 301 depicts a first common shaft on which a first non-circular drive gear 303 is fixedly mounted. A second non-circular drive gear 305 is rotatably supported by the common shaft 301. The second drive gear 305 meshes with a second non-circular driven gear 309 rotatably supported by a second common shaft and the first drive gear 303 meshes with a first non-circular driven gear 307 rotatably supported by the second common shaft 312.

The second drive gear 305 is angularly shiftable to an arbitrary angular position with respect to the first drive gear by means of a control device composed of the movable element 304, a fixed element 302 fixedly secured to the common shaft 301 and a regulating device 306.

Differential bevel gears 308 and 310 are fixedly mounted on the first and second driven gears 307 and 309, respectively, the bevel gears being meshed with a pinion gear 313. The pinion gear 313 is mounted, by a nut 314, on a differential element 311 fixedly secured to the common shaft 312.

FIG. 2 illustrates an example of the paired non-circular drive and driven gears 303 and 307 and FIG. 3 is a graph showing an angular velocity ratio given to the paired gears with concrete numerical values selected as an example. In FIG. 3, abscissa is scaled with angular shift $\theta$ of the drive gear and ordinate is scaled with angular velocity ratio R where R = (angular velocity of the driven gear)/(angular velocity of the drive gear).

FIGS. 4 to 6 are graphs showing characteristics of the conventional elemental units having different angular velocity ratios, respectively, abscissa and ordinate thereof being scaled as in FIG. 3.

In such conventional device, it is possible to establish conditions in which angular velocity ratio R becomes constant at least successibly and to continuously control a magnitude of R. The control of the angular velocity ratio R is performed by varying a relative deviation of angular position between the first and second drive gears 303 and 305 (this is referred to as "phase deviation" hereinafter) by means of the above mentioned control device. When the phase deviation is 180°, the angular velocity transmitted through the differential device to the second common shaft 312 is always equal to that of the first common shaft 301 and thus the angular velocity ratio R is unity constantly as shown in FIG. 4.

When the deviation is larger or smaller than 180°, a sequence of a region a in which the angular velocity ratio is larger than unity constantly, a region b in which R decreases, a region c in which R is smaller than unity constantly and a region d in which R increases appears repeatedly as shown in FIGS. 5 and 6. The values of R in the regions a and c vary in correlation to the phase deviation.

Therefore, by using a plurality of such units so that the regions a and c are connected, i.e., the regions b and d are eliminated, it is possible to constitute a stepless transmission. However, since such unit requires a total of 7 gears, 4 on non-circular gears and 3 of bevel gears, the number of fundamental elements of the unit becomes at least ten. Thus, when such stepless transmission be constituted with such units, the number of mechanical elements thereof becomes very large.

It has been known generally that the friction type power transmission is featured by a smooth transmission of rotation and that the non-friction type such as using gears is featured by a high transmission efficiency.

Comparing them in view of application thereof to the conventional stepless transmission, the friction type has a problem of power loss due to slippages between contact portions thereof while the non-friction type has a problem of complicated construction as mentioned above.

The advantage of the high transmission efficiency of the non-friction type transmission tends to be lost due to inertia of the mechanical elements and frictions between them.

SUMMARY OF THE INVENTION

An object of the present invention is, therefore, to provide an angular velocity modulating device for use in a stepless transmission of non-friction type, which requires a reduced number of fundamental mechanical elements, provides a higher transmission efficiency and is capable of having an automatic control function easily, comparing with the conventional non-friction type transmission.

The stepless transmission according to the present invention is based on a unique principle of mechanism to be referred to as an exponenial velocity modulation and has a construction by which the inherent advantage of the non-friction type transmission can be easily obtainable. In the present transmission, a primary and secondary angular velocity modulating means composed of a first and second pairs of gears, each including a first and second non-circular gears, the first non-circular gear being common for the pairs, are used to realize a mode transformation in which angular velocity is continuously changed exponentially. By the use of exponential function, it becomes possible to employ a mechanism by which angular velocity ratio obtained by the primary and secondary modulating means time to time can be overlapped by means of multiplication and division of them. Further, due to the fact that the first non-circular gear is commonly used for the first and second gear pairs, a new control mechanism for controlling the overlapping relation of mode transformation realized by the primary and secondary angular velocity modulating means is provided and it becomes easier to incorporate an automatic control function in the mechanism.

A fundamental function of the present device is that angular velocity of one rotary shaft is periodically changed with respect to angular velocity of the other rotary shaft on the basis of exponential velocity increase or decrease mode. The fundamental function is doubled. That is, when a modulation in exponential velocity decrease mode is applied by the secondary angular velocity modulation means while a modulation in exponential velocity increase mode is applied by the primary modulation means, a mode of angular velocity change after the both applications of modulation becomes the same as that prior to the modulation applications. If an input is in a constant angular velocity mode, the same mode will appear at an output. The present device has the function for changing the change mode concerning change of angular velocity as mentioned above. In addition thereto, it has a function for continuously changing an absolute value of angular velocity ratio between the input and the output by changing a doubling method of the primary and secondary fundamental functions, i.e., by shifting phase. Further, the change can be easily controlled automatically.

Another object of the present invention is to provide a stepless automatic transmission which includes an automatic control function by which a control of relative anglular velocity of the input and output shafts is performed directly by an operating torque on the input or output shaft.

The stepless automatic transmission according to the present invention employs an angular velocity ratio transformation by means of a planet gear mechanism to thereby incorporate a state of input/output angular velocity ratio of 0 stably into a continuously varying range of angular velocity ratio.

In order to realize this, the previously mentioned problems must be resolved and, according to the present invention, these problems are resolved by two means to be described.

First of them is to use the so-called direct control for a variable control of angular velocity ratio. A variable control mechanism of angular velocity ratio used in the present invention is activated directly by a transmission torque produced necessarily in the main function of power transmission. Main movement in the mechanism is rotation of frames arranged coaxially with the input and output shafts, respectively.

The second is that the variable control of angular velocity ratio is performed internally. That is, it contains an internal automatic control mechanism by which a freedom of selective transformation of the input shaft and the output shaft between these shafts and the fixed shaft is increased intentionally.

When a rotary drive is applied to the input shaft, a rotation power usable as an output power appears on the output shaft. The rotational velocity of the output shaft is determined according to an input shaft/output shaft angular velocity ratio characteristics which is automatically controlled according to a load torque of the output shaft and, when the torque varies, the velocity is provided as a stepless variable value. Further, in the present device, the automatic control range includes a condition in which the angular velocity of the output shaft is 0 regardless of angular velocity of the input shaft. Therefore, when the load torque reaches a preset limit value of the output torque or it exceeds the preset value, the output shaft can not rotate to thereby automatically terminate a power transmission.

BRIEF DESCRIPTION OF THE DRAWINGS

FIGS. 7 and 8 show an embodiment of the present invention, in which FIG. 7 is a cross section taken along a line I—I in FIG. 8 and FIG. 8 is a cross section taken along a line II—II in FIG. 7;

DETAILED DESCRIPTION OF THE PREFERRED EMBODIMENTS

Figure 1:
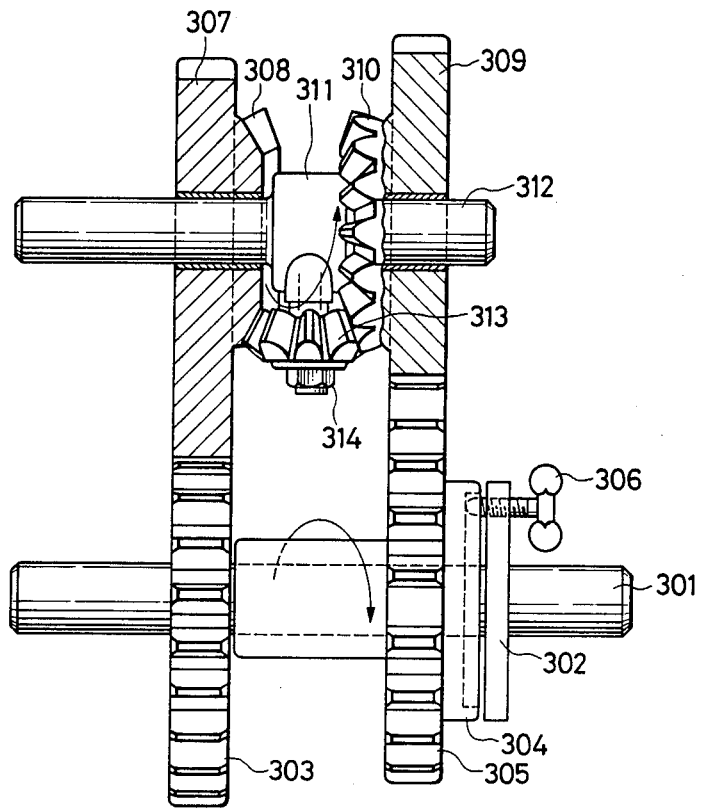
FIG. 1 is a partially cross sectioned side view of a conventional stepless transmission.
Figure 2:
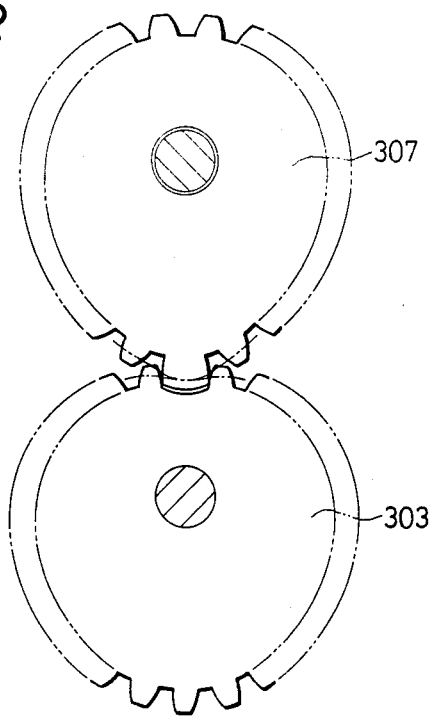
FIG. 2 is a front view of a drive gear and a driven gear of the transmission in FIG. 1.
Figure 3:
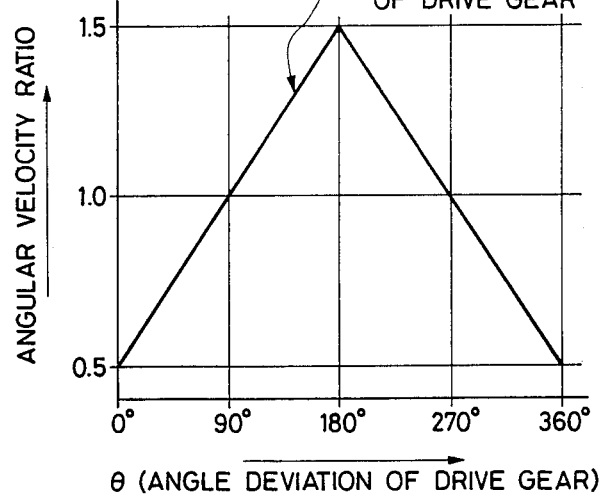
FIG. 3 is a graph showing an angular velocity ratio of the gears shown in FIG. 2.
Figure 4:
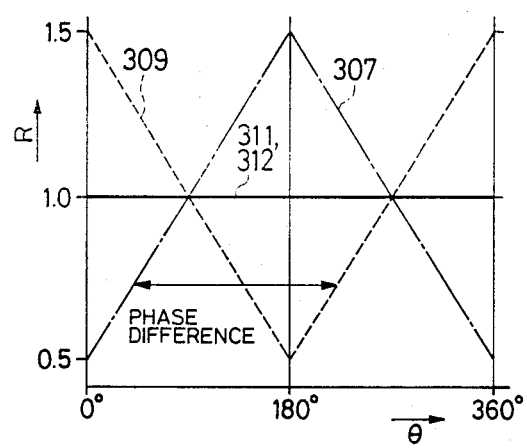
FIGS. 4 to 6 are graphs showing characteristics of the transmission in FIG. 1.
Figure 5:
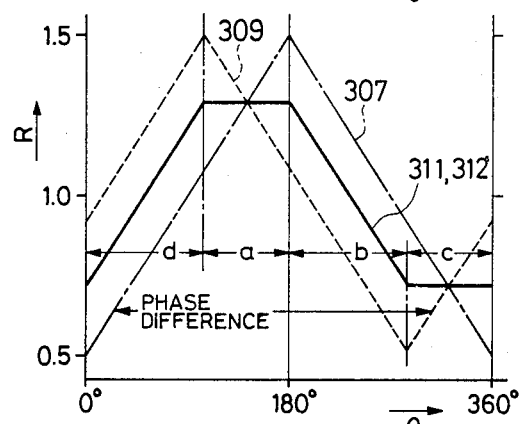
Figure 6:
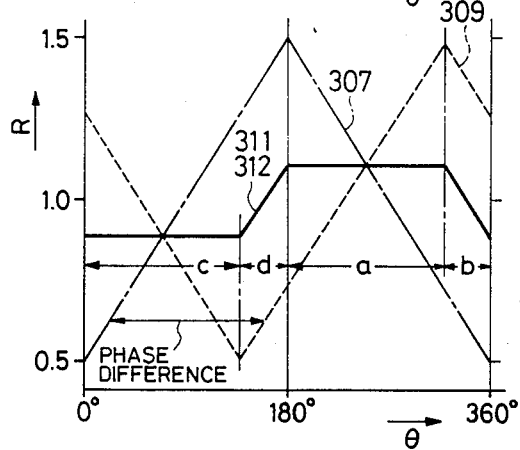
Figure 7:
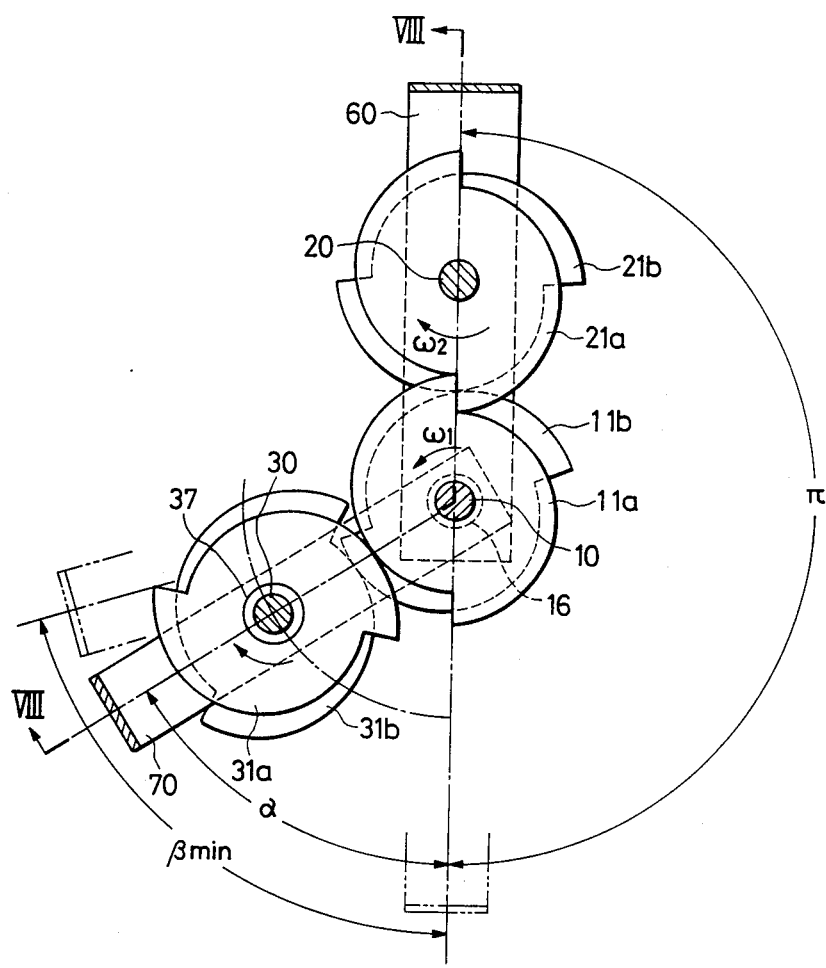
Figure 8:
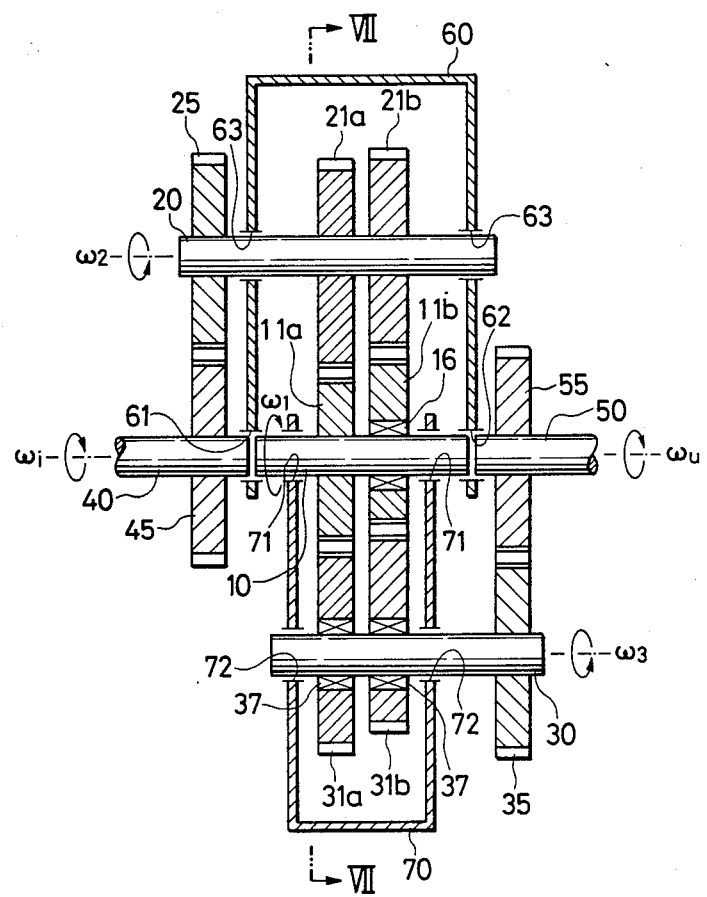

FIG. 7 is a front view of a basic embodiment of an angular velocity modulating device according to the present invention and FIG. 8 is a cross-sectional side view thereof. In FIGS. 7 and 8, a reference nuemral 10 depicts a first rotary shaft on which a first non-circular gear 11a of a first gear set is fixedly mounted and a first non-circular gear 11b of a second gear set is supported rotatably through a bearing 16. A reference numeral 20 depicts a second rotary shaft on which a second non-circular gear 21a of the first gear set and a second non-circular gear 21b of the second gear set are mounted fixedly. A reference numeral 30 depicts a third rotary shaft on which a third non-circular gear 31a of the first gear set and a third non-circular gear 31b of the second gear set are supported through bearings 37 having one-way clutch functions, respectively.

A reference numeral 60 is a first frame which, in this embodiment, a stationary frame constituting a body of the device. The frame 60 supports the rotary shaft 10 through bearings 61 and 62 and the rotary shaft 20 through bearings 63. A circular gear 25 is fixedly mounted on the rotary shaft 20. A fourth rotary shaft 40 has one end supported rotatably by the frame 60 through a bearing 61, on which a circular gear 45 is fixedly mounted. A reference numeral 70 depicts a second frame which, in this embodiment, is movable and supported rotatably by the rotary shaft 10 through bearing 71 and supports the rotary shaft 30 through bearings 72. A fifth rotary shaft 50 has one end supported by the frame 60 through a bearing 62, on which a circular gear 55 is fixedly mounted.

As is clear from FIG. 7, the first frame 60 and the second frame 70 are rotatable relatively with the first rotary shaft 10 being fulcrum. A relative rotation angle is shown in FIG. 7 by $\alpha$. The rotation angle $\alpha = 0.415\pi$ at maximum.

The first, second and third rotary shafts 10, 20 and 30, the non-circular gears 11a, 21a and 31a of the first gear set and the first and second frames 60 and 70 constitute a first unit of the present angular velocity modulating device and the first, second and third non-circular gears 11b, 21b and 31b of the second gear set together with these rotary shafts and the frame constitute a second unit of the device.

An operation of the stepless automatic transmission constituted with the first and second angular velocity modulating units mentioned above will be described with reference to FIGS. 7 and 10. Assuming that the rotary shaft 40 is an input shaft and the fifth rotary shaft 50 is an output shaft, a ratio of angular velocity obtainable at the fifth rotary shaft 50 to angular velocity given to the fourth rotary shaft 40 varies continuously in correlation to the continuously controllable angle $\alpha$. Describing this in detail with reference to FIGS. 9 and 10 in which the first and second non-circular gears 11a and 21a are shown (this is also applicable to the first and second non-circular gears 11b and 21b), reference numerals 12 and 13 are pitch curves of meshing of the first non-circular gear 11a and 22 and 23 are pitch curves of meshing of the second non-circular gear 21a. It should be noted that along the meshing pitch curves involute teeth are provided as shown partially. Since relations such as angular velocity or transmission torque of the meshed gears can be explained with using the meshing pitch cuves, these teeth are at least partially omitted for simplicity of illustration.

The curves 12 and 13 extend from a point $S_{1a}$ to $L_{1a}$ and from a point $S_{1b}$ to a point $L_{1b}$, respectively, with lengths of them being made equal to those of the meshing pitch curves 22 and 23 extending from a point $L_{2a}$ to a point $S_{2a}$ and from $L_{2b}$ to $S_{2b}$, respectively. Thus, a total number of teeth of the first non-circular gear 11a is made equal to that of the second non-circular gear 21a.

Features concerning angular velocity obtainable by the pair of non-circular gears constructed as above is one of important points of the present invention.

Figure 9:
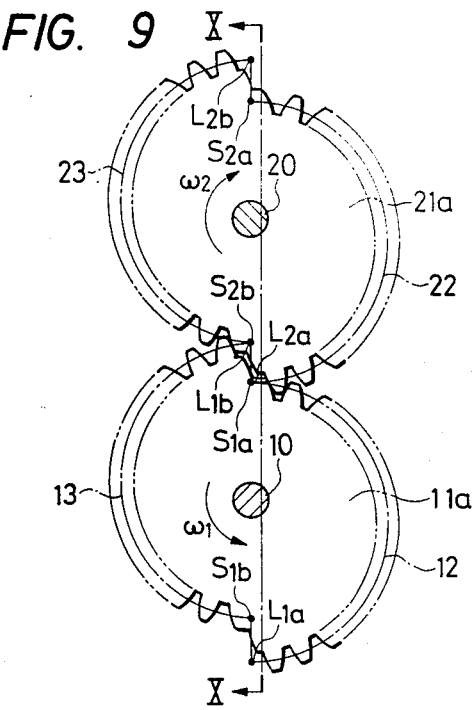
FIG. 9 is a front view of a first and second non-circular gears in FIG. 7.
Figure 11:
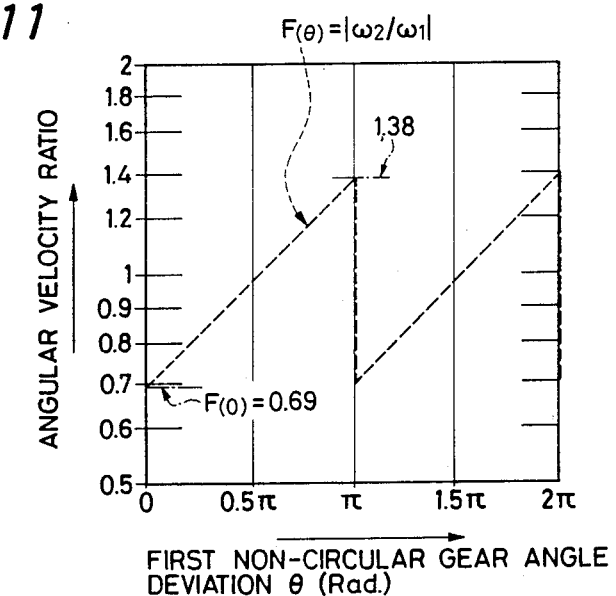
FIG. 11 is a graph showing an angular velocity ratio between the first and second non-circular gears in FIG. 9.

FIG. 11 is a graph showing a function of angular velocities of the first and second non-circular gears 11a and 21a in which abscissa is scaled with an angular deviation $\theta$ of the first non-circular gear 11a for one revolution thereof in counterclockwise direction as shown in FIG. 9 with $\theta$ being 0 at a time when meshing points are $S_{1a}$ and $L_{2a}$. Ordinate of this graph is scaled with logarithm of absolute number representative of angular velocity ratio to angular velocity of the non-circular gear 11a. Representing angular velocity of the first non-circular gear 11a by $\omega_1$ and that of the second non-circular gear 21a by $\omega_2$ a function of $\theta$, $F(\theta) = |\omega_2/\omega_1|$, indicates an angular velocity ratio between the first and second non-circular gears 11a and 21a.

In the graph shown in FIG. 11, a counterclockwise rotation of the non-circular gear 11a from the state shown in FIG. 9 by $\pi$ radians so that the meshing point thereof with the non-circular gear 21a are changed from $S_{1a}$ and $L_{2a}$ to $L_{1a}$ and $S_{2a}$ is shown by a steadily increasing line starting at a reference angular velocity ratio $F(0)$. A further counterclockwise rotation of $\pi$ radians is shown by a similar line. The variation of $F(\theta)$ of the non-circular gear pair can be shown by the straight line on the semilog graph. Describing this albracially, the angular velocity ratio $F(\theta)$ is given by exponential function $e^{K \cdot \theta} \cdot F(0)$ where a constant K is an angular velocity modulating coefficient which can be selected arbitrarily and can be defined in the graph in FIG. 11 as a differentiated value $K = d \log F(\theta)/d\theta$, in the embodiment shown in FIG. 9, $K = 0.2206$ rad$^{-1}$, and e is base of natural logarithm.

Figure 12:
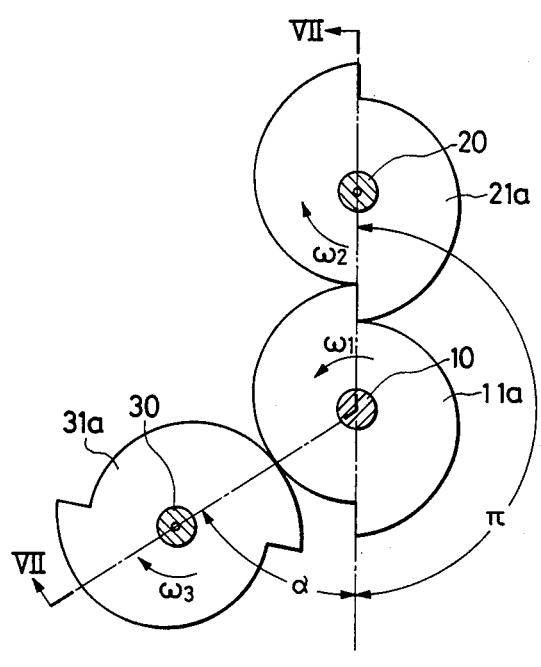
FIG. 12 is a front view showing a meshing condition between the first, second and third non-circular gears.
Figure 13:
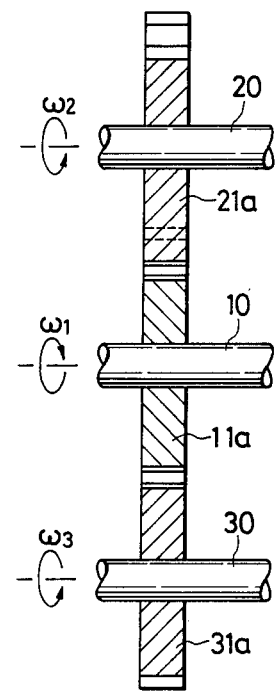
FIG. 13 is a cross section taken along a line VII—VII in FIG. 12.

A unique angular velocity modulating function which can be derived from the feature of angular velocity ratio of the above mentioned non-circular gears will be described with reference to FIGS. 12 and 13 which show a portion of the angular velocity modulating device shown in FIGS. 7 and 8, in front view and cross-sectioned side view, respectively. That is, FIGS. 12 and 13 show the third non-circular gear 31a in addition to the first and second non-circular gears 11a and 21a in FIGS. 9 and 10. The third non-circular gear 31a is identical to the second non-circular gear 21a. The first and second non-circular gears 11a and 21a constitute a primary angular velocity modulating means and the first and third non-circular gears 11a and 31a constitute a secondary angular velocity modulating means. The primary angular velocity modulating means serves to determine a ratio of angular velocity $\omega_2$ of the second rotary shaft 20 to angular velocity $\omega_1$ of the first rotary shaft 10, the ratio being a primary angular velocity ratio. Similarly, the second angular velocity modulating means serves to determine a ratio between angular velocities $\omega_1$ and $\omega_3$ of the rotary shafts 10 and 30, the ratio being a secondary angular velosity ratio. The primary angular velocity modulating means was described with reference to FIGS. 9 and 11 and the secondary angular velocity modulating means is similar to the primary means. However, it should be noted that with a position of the first rotary shaft 10 as a reference, the third shaft 30 is arranged at $\pi + \alpha$ radians with respect to a position of the second shaft 20. Since the third non-circular gear 31a positioned at the same position around the first non-circular gear 11a every $\pi$ radians, $\pi + \alpha$ radians is equivalent to a center angle $\alpha$. Therefore, when the primary angular velocity modulating means is in a meshing state at the angular deviation $\theta$ of the first non-circular gear 11a, the secondary angular velocity modulating means is in a meshing condition at angular deviation $\theta + \alpha$ of the first non-circular gear 11a. In order to establish this condition, the secondary angular velocity ratio $\omega_3/\omega_1$ has a value $e^{K \cdot (\theta + \alpha)} \cdot F(0)$ when the primary angular velocity ratio $\omega_2/\omega_1$ has a value $e^{K \cdot \theta} F(0)$. In this state, the angular velocity ratio of the third shaft 30 to that of the second shaft 20 becomes $e^{K \cdot \alpha}$. The exponential equation $e^{K \cdot \alpha}$ exhibits a fundamental feature of the characteristics of the present angular velocity modulating device.

Figure 14:
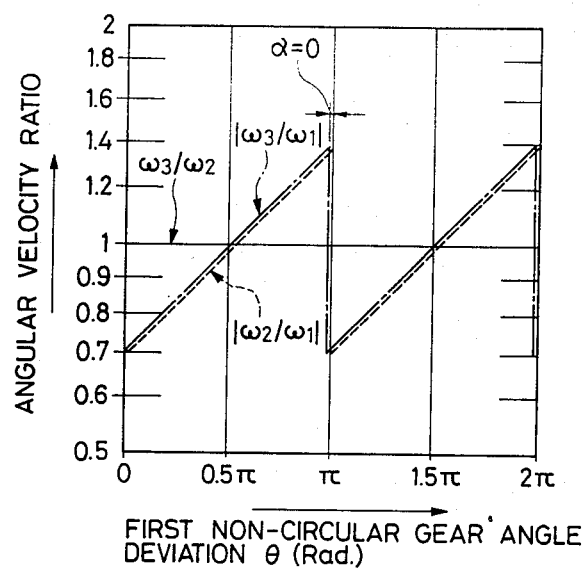
FIGS. 14 to 17 are graphs showing the characteristics of the stepless transmission in FIG. 7.
Figure 15:
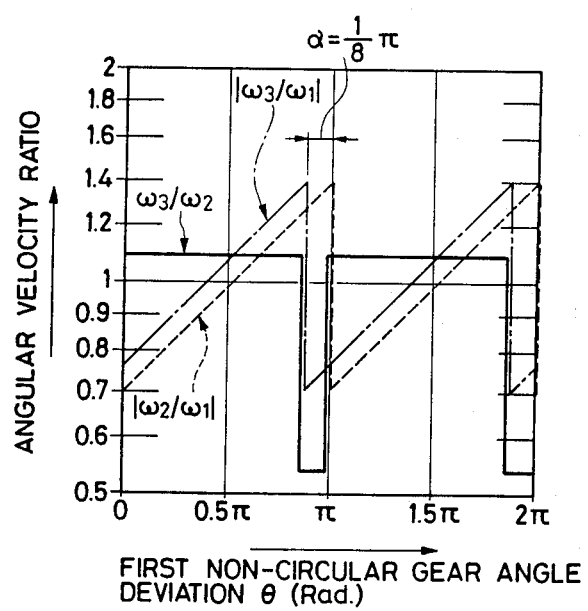
Figure 16:
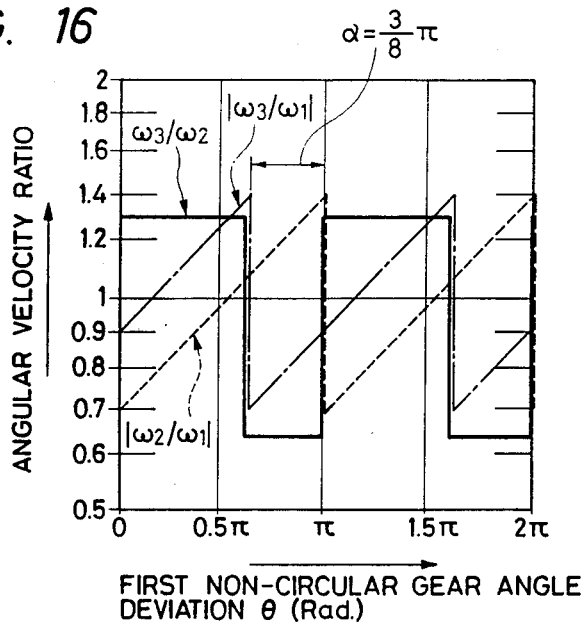
Figure 17:
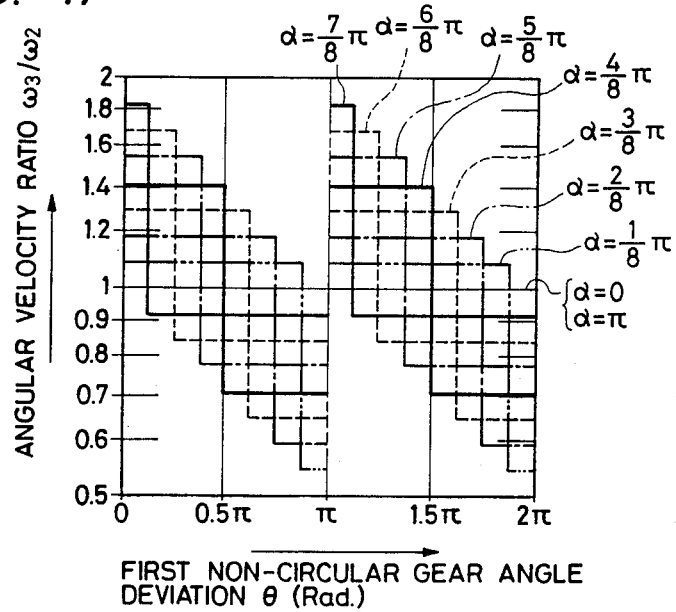

FIGS. 14 to 16 are graphs showing the characteristics of the angular velocity modulating device according to an embodiment of the present invention, in which abscissa and ordinate are the same as those shown in FIG. 11, FIG. 14 is the graph when $\alpha=0$, in which the primary angular velocity ratio is always equal to the secondary ratio and $\omega_3/\omega_2=1$. In FIG. 15, $\alpha=(\frac{1}{8})\pi$ and a variation pattern of the secondary angular velocity ratio is advanced by $\alpha$ radians from that of the primary angular velocity ratio. In such condition as being not zero, except a case of $\alpha=\pi$, a range in which the primary and secondary angular velocity ratio can vary continuously is $0\sim\pi-\alpha$, $\pi-\alpha\sim\pi$, $\pi\sim 2\pi-\alpha$ and $2\pi-\alpha\sim 2\pi$. In the sections $0\sim\pi-\alpha$ and $\pi\sim 2\pi-\alpha$, there is a constant value of $e^{K\cdot\alpha}$ of the angular velocity ratio $\omega_3/\omega_2$, and in the sections $\pi-\alpha\sim\pi$ and $2\pi-\alpha\sim 2\pi$, there is a constant value of $e^{K(\alpha-\pi)}$ of the ratio $\omega_3/\omega_2$. FIG. 16 shows a case where $\alpha$ is increased from that shown in FIG. 15 to $(\frac{3}{8})\pi$. That is, FIG. 16 differs from that shown in FIG. 15 in that the value of $\omega_3/\omega_2$ varies in correlation to an increase of $\alpha$ and that the sections in which the value of $\omega_3/\omega_2$ changes continuously are also varied. FIG. 17 shows a variation of the angular velocity ratio $\omega_3/\omega_2$ when $\alpha$ is changed from 0 to $\pi$ with increment of $\pi/8$.

The present device is equipped with the angular velocity modulation function based on the unique concept that the exponential angular velocity modulating means are applied to the stepless automatic transmission. In order to realize such transmission, it is enough to combine a plurality of such exponential angular velocity modulating means with means for controlling the value, means for making the constant regions of angular velocity ratio $\omega_3/\omega_2$ continuous and means for selectively deriving a paritcular value from the repetitive pattern of the angular velocity ratio.

The means for controlling the value can be obtained by constructing the first frame 60 such that it is rotatable with respect to the second frame 70 as mentioned previously. This means can be used for a plurality of the modulating means commonly.

The continuous means can be realized by fixing the second non-circular gear 21b with respect to the second non-circular gear 21a with a rotational phase difference of $\pi/2$ radians. Representing the angular velocity ratio $\omega_3/\omega_2$ of the first gear set composed of the first non-circular gear 11a, the second non-circular gear 21a and the third non-circular gear 23a by a function $G_1(\theta)$ and the angular velocity ratio $\omega_3/\omega_2$ of the second angular velocity modulating means composed of the first non-circular gear 11b, the second non-circular gear 21b and the third non-circular gear 31b by a function $G_2(\theta)$, $G_2(\theta)=G_1(\theta-\beta)\cdot\beta$ is a phase angle difference of the pair of first non-circular gears 11a and 11b on the first shaft 10 and corresponds to phase angle difference $\pi/2$ given to the pair of non-circular gears 21a and 21b on the second shaft 20. The value of $\beta$ is a function of angle deviation $\theta$ of the first shaft 10. In the embodiment shown in FIG. 7, the minimum value $\beta_{min}$ of $\beta$ is 0.415 radians.

Figure 18:
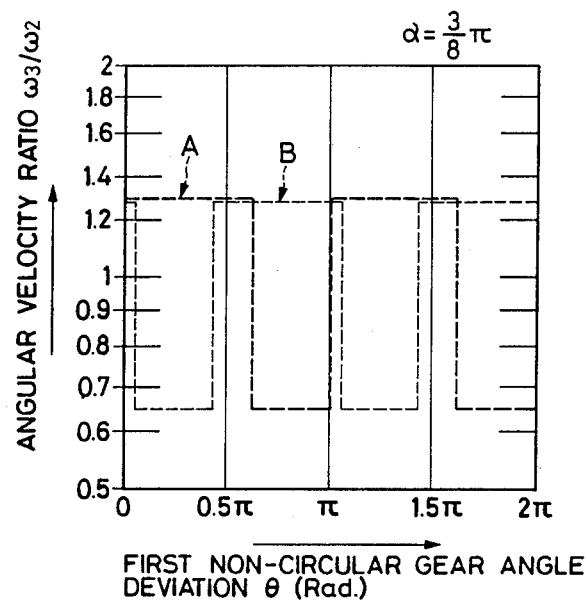
FIG. 18 is a graph showing one of the transmission functions of the device in FIG. 7.

FIG. 18 is a graph showing the angular velocity ratio $\omega_3/\omega_2$ of the first and second angular velocity modulating means by A and B, respectively. In a range in which $\alpha\leq\beta_{min}$ is satisfied, it is possible to make the constant value of $e^{K\cdot\alpha}$ of the angular velocity ratio $\omega_3/\omega_2$ continuous over a full range of the angle deviation $\theta$. The graph in FIG. 18 shows a case of $\alpha=(\frac{1}{8})\pi$ as an example within the range.

The selectively deriving means can be realized by a one-way clutch. The angular velocity ratio based on $\omega_2$ as a reference of the pair of the third non-circular gears 31a and 31b shown in FIGS. 7 and 8 are shown in FIG. 18 as the curves A and B. When the values of A and B are different from each other, the bearing 37 having the one-way clutch function transmits an angular velocity based on either of them to the third shaft 30. In this embodiment, rotational power is transmitted in only the direction from the third non-circular gears 31a and 31b to the third shaft 30. Therefore, the higher one of the angular velocity ratios A and B attributes to the driving of the shaft 30 and the lower one is omitted by means of the bearing 37 having one-way clutch function.

As is clear from the foregoings, the angle $\alpha$ is controllable continuously and thus the angular velocity ratio $\omega_3/\omega_2$ is controllable continuously. When the $\alpha$ is fixed, the angular velocity ratio can be fixed to a constant value correlated to the value $\alpha$. In FIG. 8, the fourth and fifth shafts 40 and 50 are provided which are connected to the second and third shafts 20 and 30 through a pair of circular gears 45 and 25 and a pair of circular gears 55 and 35 mounted thereon as shown in FIG. 8. This is an example in a case where an input shaft and an output shaft of the stepless transmission are arranged coaxially. The teeth number ratio of the circular gears 45 and 25 and the teeth number ratio of the circular gears 55 and 35 can be selected arbitrarily. These teeth number ratios are effective as means for fixedly regulating a rotational speed ratio between the input and output shafts of the stepless transmission. However, such ratios are meaningless in the present invention based on the concept of angular velocity modulation.

Figure 19:
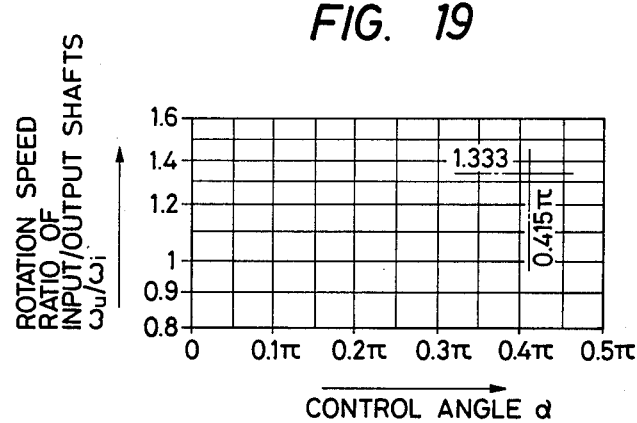
FIG. 19 is a graph showing an input/output shaft rotation speed ratio due to a rotation angle of a second frame of the device in FIG. 7.

FIG. 19 is a graph showing a characteristics curve of rotational speed ratio between an input shaft and an output shaft of the embodiment shown in FIGS. 7 and 8 in which the teeth number ratios of the gear pair 45 and 25 and the gear pair 55 and 35 are 1, respectively, the fourth shaft 40 and the fifth shaft 50 are used as the input shaft and the output shaft, respectively. In FIG. 19, the input-output rotational speed ratio $\omega_u/\omega_i$ corresponding to the angle which is controllable by rotating the second frame 70 is shown as a slanted line on the semilog graph.

Figure 10:
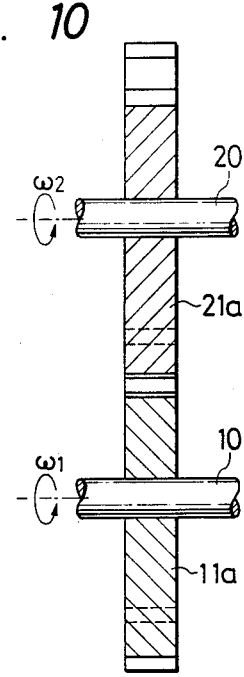
FIG. 10 is a cross section taken along a line IV—IV in FIG. 9.
Figure 20:
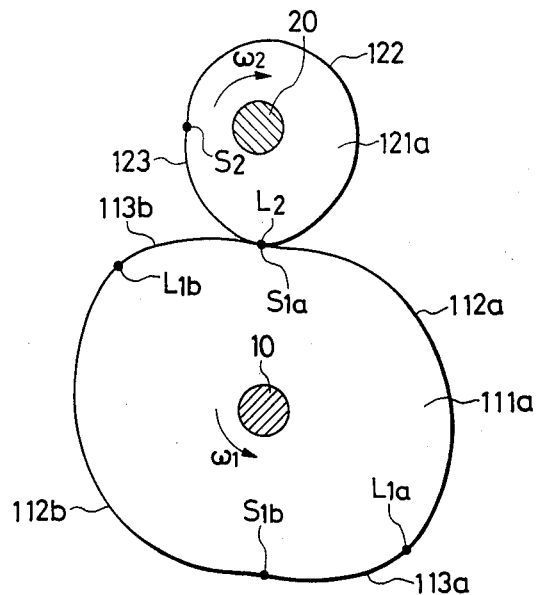
FIGS. 20 to 23 show another embodiment of the present invention.
Figure 21:
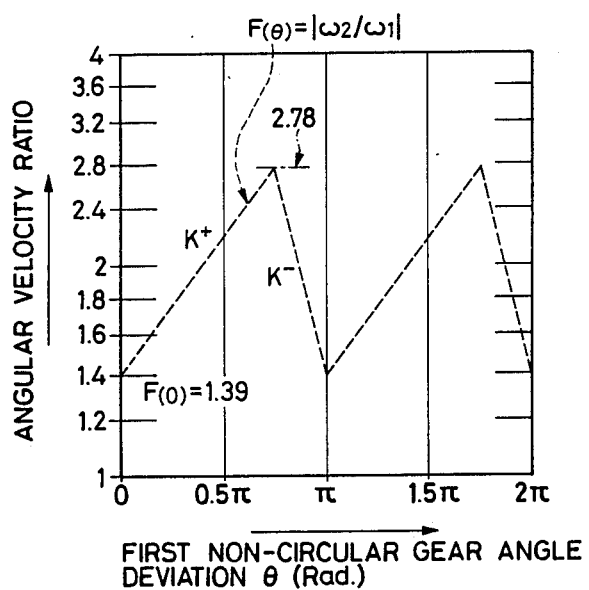

The present angular velocity modulating device has been described hereinbefore with reference to the non-circular gear shown in FIGS. 9 to 11. However, the configulation of the non-circular gear is not limited to those shown. FIG. 20 shows another embodiment of the angular velocity modulating device which employs a pair of non-circular gears having configuration different from those shown in FIG. 9. In FIG. 20, a first non-circular gear 111a has mesh pitch curves 112a, 113a, 112b and 113b. A second non-circular gear 121a has mesh pitch curves 122 and 123. FIG. 21 is a graph showing an angular velocity relation between the first non-circular gear 111a and the second non-circular gear 121a. The scaling of abscissa and ordinate thereof and definitions of $\theta$, $\omega_1$, $\omega_2$, $F(\theta)$ and $F(0)$ are the same as those in FIG. 11.

A variation of angular velocity ratio $F(\theta)$ during the first non-circular gear 111a rotates from the position in FIG. 20 by $(\frac{3}{4})$ rad so that the mesh points of the gears 111a and 121a are moved from $S_{1a}$ and $L_2$ to $L_{1a}$ and $S_2$ is shown by an increasing line expressed by $F(\theta)=e^{K_1\theta}\cdot F(0)$. With a further rotation of the gear 111a by $(\frac{1}{4})$ rad and the mesh points move to $S_{1b}$ and $L_2$, the variation is shown by a decreasing line expressed by $F(\theta)=e^{K_2\cdot(\theta-\pi)}\cdot F(0)$. At this time point, the non-circular gears 111a and 121a complete a $\pi$ rad and a $2\pi$ rad rotations, respectively. The angular velocity varies in the same manner for a further $\pi$ rad rotation of the gear 111a, i.e., a further $2\pi$ rad rotation of the gear 121a. Coefficients K1 and K2 in the embodiment in FIG. 20 are 0.2942 rad$^{-1}$ and 0.8826 rad$^{-1}$, respectively.

Figure 22:
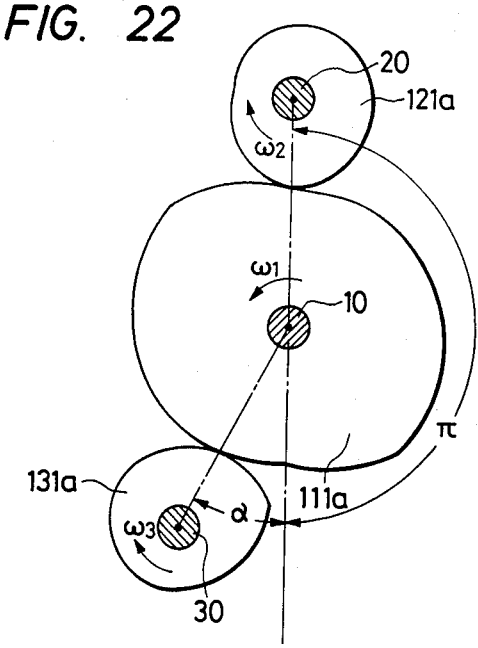

FIG. 22 shows a main portion of another embodiment of the angular velocity modulating device constittued with the non-circular gear pairs shown in FIG. 20. In FIG. 22, a third non-circular gear 131a is added to the first and second gears 111a and 121a. The third gear 131a is identical to the second gear 121a.

Figure 23:
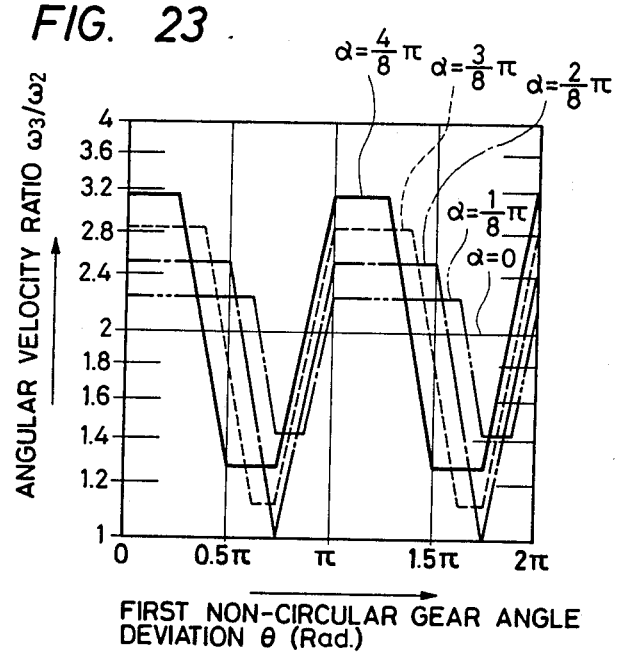

FIG. 23 is a graph showing characteristics curves of this embodiment. The scalings of abscissa and ordinate and definitions of $\theta$, $\alpha$ and $\omega_3/\omega_2$ are the same as those in FIG. 17.

Figure 24:
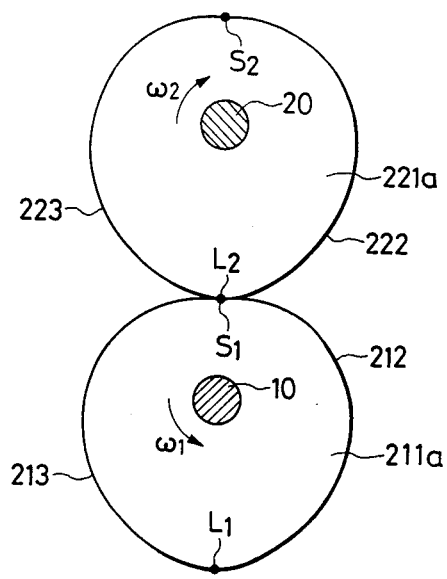
FIGS. 24 to 28 show a further embodiment of the present invention.

FIG. 24 shows another embodiment of the present invention, in which a first non-circular gear 211a has mesh pitch curves 212 and 213 and a second non-circular gear 221a has mesh pitch curves 222 and 223.

Figure 25:
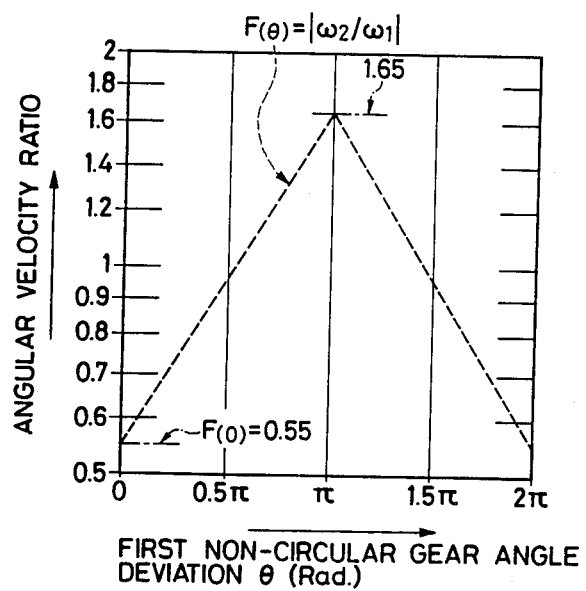

FIG. 25 is a graph showing a relation of angular velocities of the first and second non-circular gears 211a and 221a, in which the scalings of abscissa and ordinate and definitions of $\theta$, $\omega_1$, $\omega_2$, $F(\theta)$ and $F(0)$ are the same as those in FIG. 11. A variation of angular velocity ratio $F(\theta)$ when the first non-circular gear 211a rotates from the position in FIG. 24 by $\pi$ rad and mesh points of the first and second gears 211a and 212a are moved from $S_1$ and $L_2$ to $L_1$ to $S_2$ is shown by an increasing line expressed by $F(\theta)=e^{K3\cdot\theta}\cdot F(0)$ and that when the gear 211a further rotates by $\pi$ rad and mesh points move to $S_1$ and $L_2$ is shown by a decreasing line expressed by $F(\theta)=e^{K4\cdot(\theta-2\pi)}\cdot F(0)$, where K3=0.3497 rad$^{-1}$ and K4=0.349 rad$^{-1}$.

Figure 26:
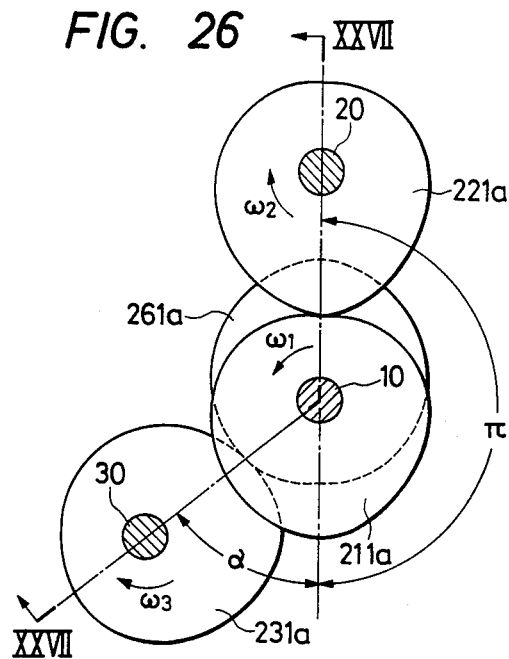
Figure 27:
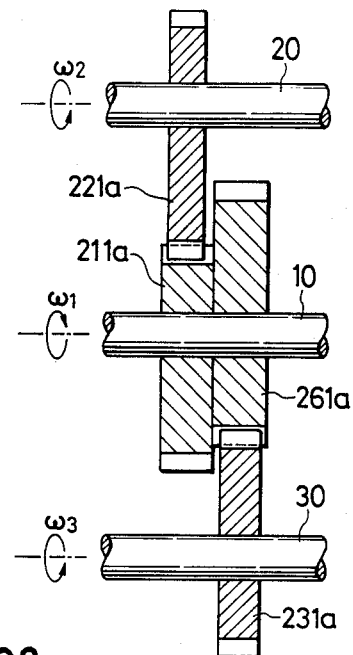

FIGS. 26 and 27 show a main portion of the angular velocity modulating device constituted with the non-circular gear pairs such as shown in FIG. 24. In these figures, a first non-circular gear 261a and a third non-circular gear 231a are added to the first and second gears. The third gear 231a is identical to the second gear 221a and the first gear 261a is identical to the first gear 211a. In this embodiment, the gears 211a and 261a are arranged on the first shaft 10 with a phase difference of $\pi$ rad therebetween. Therefore, the side view thereof in FIG. 27 is different from that shown in FIG. 13. The first gears 211a and 261a are integrally fixed so that they rotate at the angular velocity $\omega_1$ of the first shaft 10 and, thus, it is possible to consider the gears 211a and 261a as a unit element which corresponds to the first non-circular gear 11a in FIG. 12.

Figure 28:
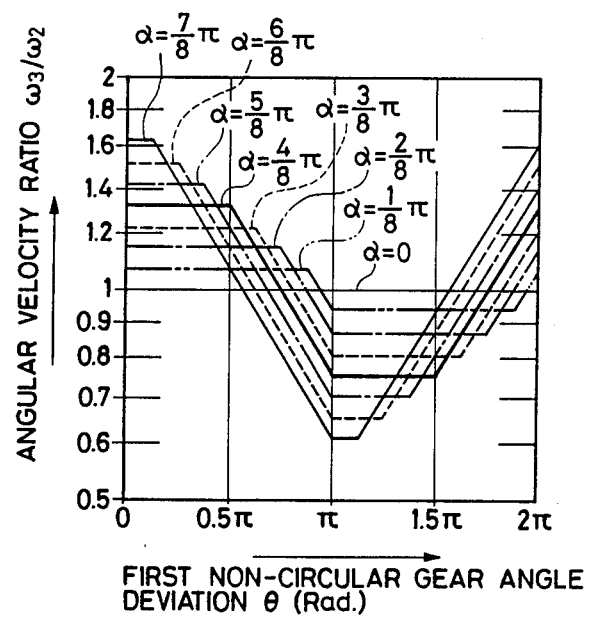

FIG. 28 is a graph showing an operational characteristics of the angular velocity modulation device shown in FIGS. 26 and 27, in which the scalings of abscissa and ordinate and definitions of $\theta$, $\alpha$ and $\omega_3/\omega_2$ are the same as those in FIG. 17.

The embodiment shown in FIGS. 20 to 23 and the embodiment shown in FIGS. 24 to 28 can constitute the stepless transmission, respectively, by using at least two sets of the elemental units in the embodiment in FIGS. 20 to 23 and at least three sets thereof in the embodiment in FIGS. 24 to 28. The characteristics of these embodiments are the same as that of the first embodiment in that there is a primarily proportional correlation between the control angle $\alpha$ and the speed ratio $\omega_u/\omega_i$ between the input and output shafts.

Although in these embodiments, the first frame 60 is stationary and the second frame 70 is movable with respect thereto, these situations can be reversed.

Figure 29:
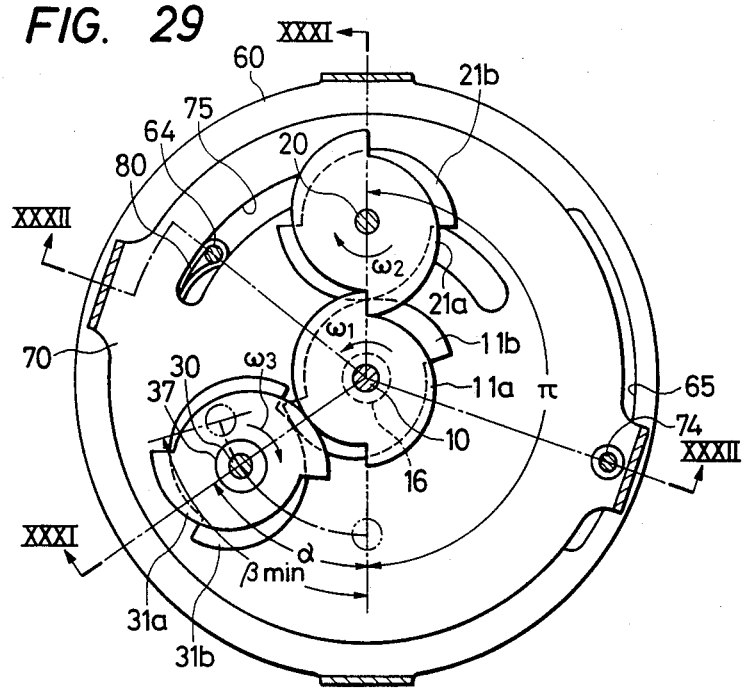
FIGS. 29 to 32 show another embodiment of the present invention.
Figure 30:
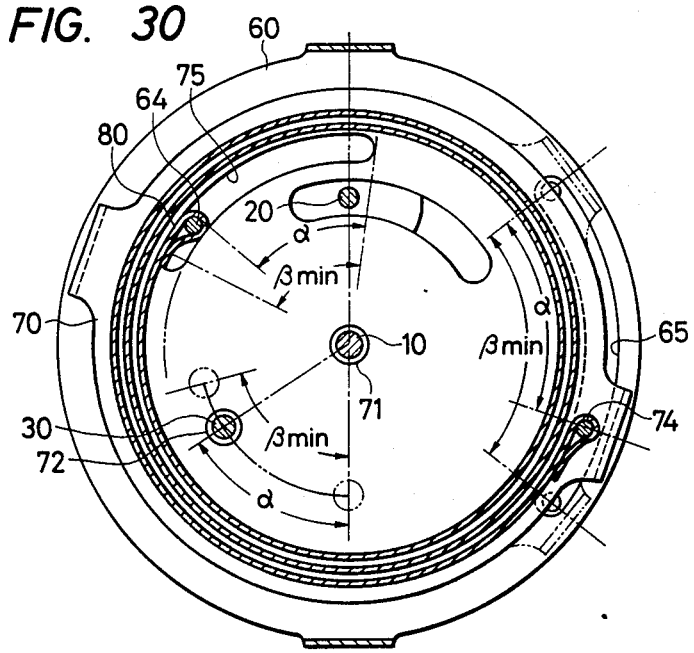
Figure 31:
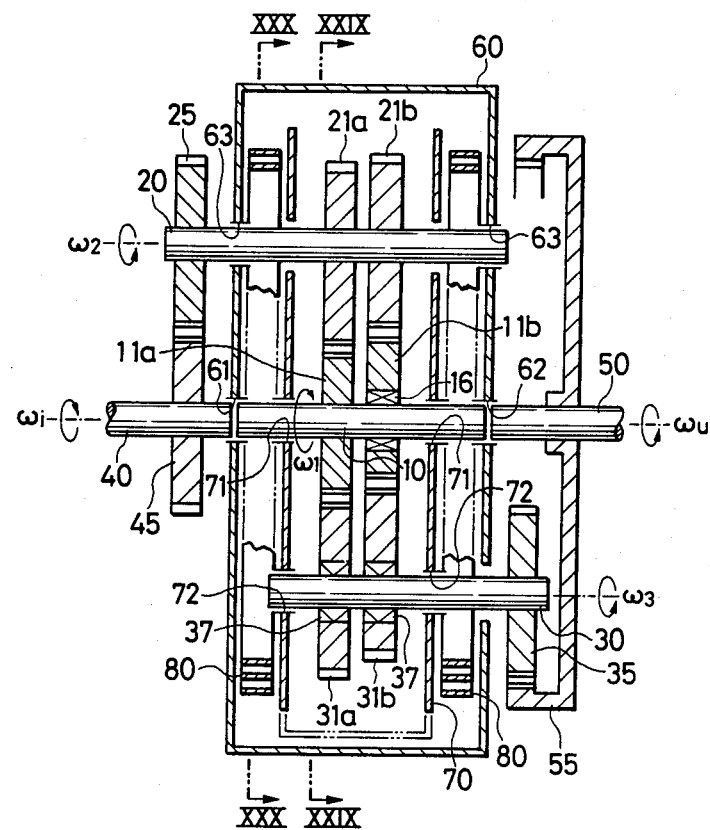
Figure 32:
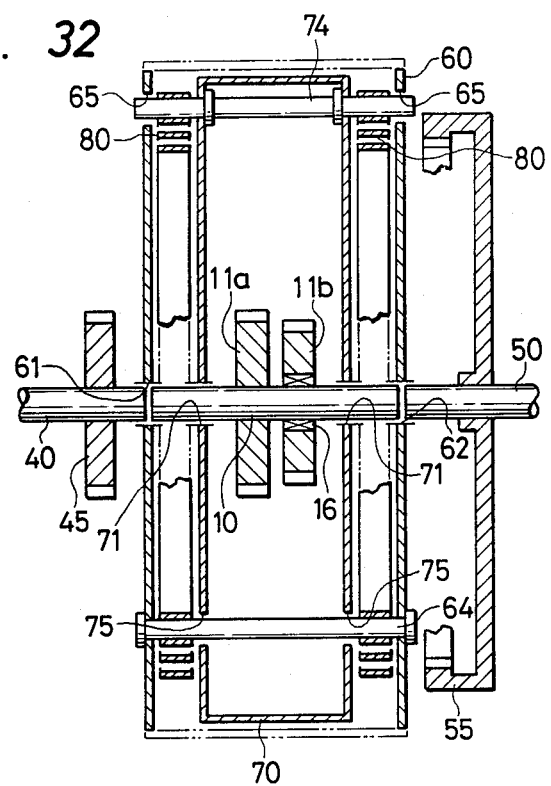

FIGS. 29 to 32 show another embodiment of the present invention which differs from that shown in FIG. 8 in that a torsional member 80 is added thereto and the circular gear 55 is substituted by an internal gear 56, in which FIG. 29 is a front view of the present stepless transmission shown in FIG. 8 in detail, FIG. 30 is a front view of the same with an upper portion being removed, FIG. 31 is a cross section taken along a line XXXI—XXXI in FIG. 29 and FIG. 32 is a cross section taken along a line XXXII—XXXII in FIG. 29. In FIGS. 29 to 32, the first frame 60 is stationary and supports the first shaft 10 through the bearings 61 and 62 and the second shaft 20 through the bearings 63. A first pin 64 is supported at opposite ends thereof by side plates of the frame 60. First limit slots 65 are formed in the frame 60. A second pin 74 is supported at opposite ends thereof by the movable second frame 70. Extensions of the pin 74 protruding from the frame 70 outwardly are inserted into the limit slots 65. Second limit slots 75 are formed in the frame 70 into whidh the first pin 64 is inserted. A torsion member in the form of a spiral spring 80 is provided between the pins 64 and 74 to bias the frame 70 in clockwise direction to thereby urge the pin 64 to one end of the limit slots 75 for maintaining $\alpha=\beta_{min}$ when there is no external force other than that provided by the spring 80. The pin 74 is also urged to one end of the limit slots 65 to regulate the angular positions of the frames 60 and 70 so that $\alpha=\beta_{min}$ is established.

When some external force resisting the force applied by the spring 80 is exerted on either of the frames 60 and 70 so as to rotate the frame 70 counterclockwisely, the angle $\alpha$ becomes smaller than $\beta_{min}$. When such external tortion force is larger than the maximum value of the torsion torque given by the spring 80, the pin 64 is urged to the other ends of the limit slots 75 so that $\alpha=0$ is established. At this time, the pin 74 is also urged to the other ends of the limit slots 65 to make the angular position $\alpha=0$.

Figure 33:
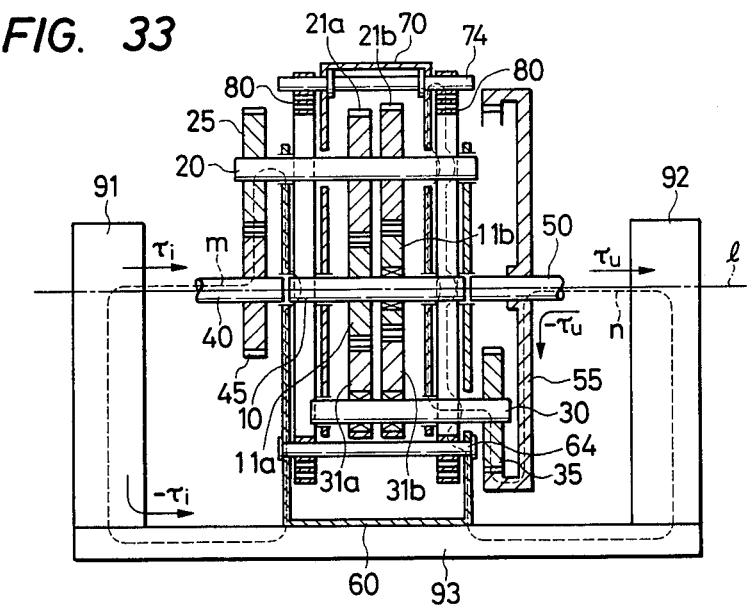
FIG. 33 illustrates a torque balance condition in the embodiment in FIGS. 29 to 32.

FIG. 33 illustrates a torque balance established in the embodiment in FIGS. 29 to 32 when a power from a prime mover is being transmitted therethrough to a load device, in which reference numerals 91, 92 and 93 depict the prime mover, the load device and a common base on which the respective devices are mounted, respectively. A line l is a common rotational axis of the devices and $\tau_i$ amd $\tau_u$ are an input torque and an output torque with respect to the common line l. Closed lines m and n are a path which is dynamically balanced with respect to the input torque $\tau_i$ and a path which is dynamically balanced with respect to the output torque $\tau_u$, respectively. The prime mover 91 gives a reaction torque $-\tau_i$ to the base 93 when it drives the shaft 40 with the input torque $\tau_i$. These torques are balanced in the path m extending through the second shaft 20 and the first frame 60. On the other hand, the fifth shaft 50 provides a reaction torque $-\tau_u$ through the third shaft 30 to the second frame 70 when it drives the load device 92 with the output torque $\tau_u$. The torque $\tau_u$ applied to the load 92 acts through the base 93 to the frame 60. Thus, a rotational torque corresponding to the output torque $\tau_u$ acts between the frames 60 and 70 and the torsional torque of the spring 80 provided between the frames balances with the torque $\tau_u$, resulting in a torque balance condition in the closed path n. The reason why not the input torque $\tau_i$ but the output torque $\tau_u$ does act to the spring 80 is that the frame 60 is stationary while the frame 70 is movable. When it is desired that only the input torque $\tau_i$ acts to the torsion member 80, it is enough to make the frame 60 movable while the frame 70 stationary.

In this embodiment, the ratios of teeth numbers between the gears 45 and 25 and between the gears 56 and 35 can be selected arbitrarily as mentioned previously. The teeth number ratios affect, in addition to the matching of the rotational speed ratio of the input and output shafts of the transmission, the transmission torque and the elasticity of the torsion member in view of an automatic control characteristics of the transmission.

Figure 34A:
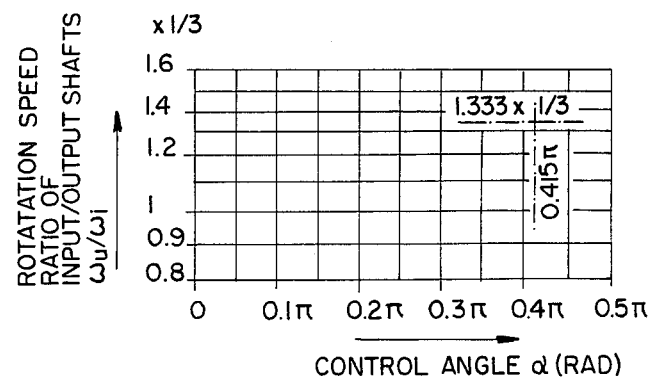
FIGS. 34a and 34b and 34c are graphs showing a total characteristics of the embodiment in FIGS. 29 to 32.
Figure 34B:
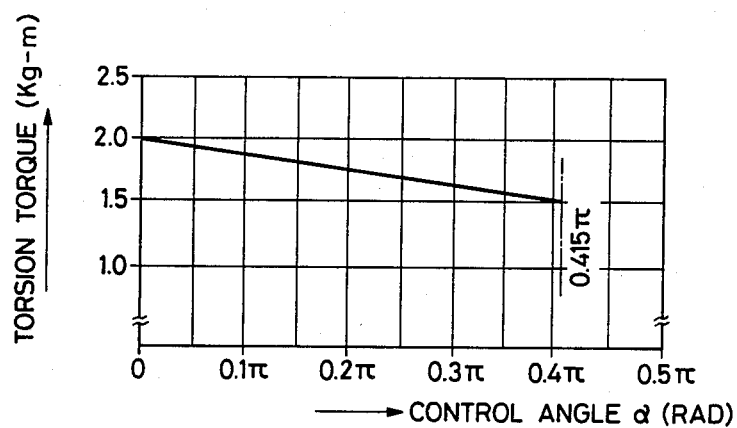
Figure 34C:
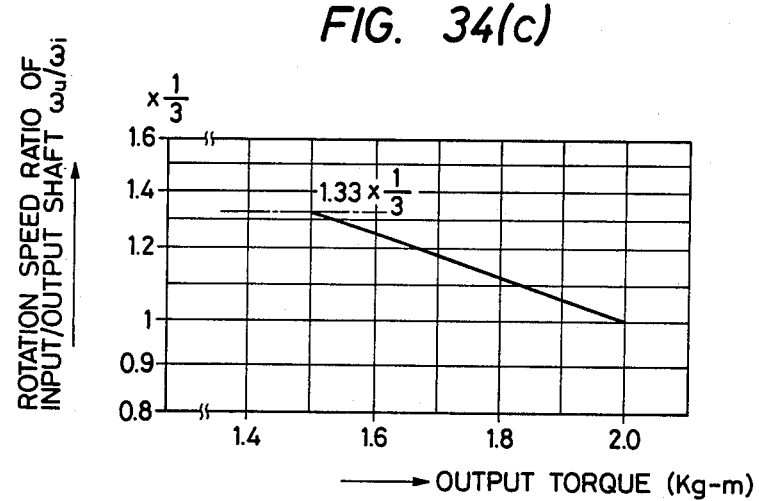
Figure 35:
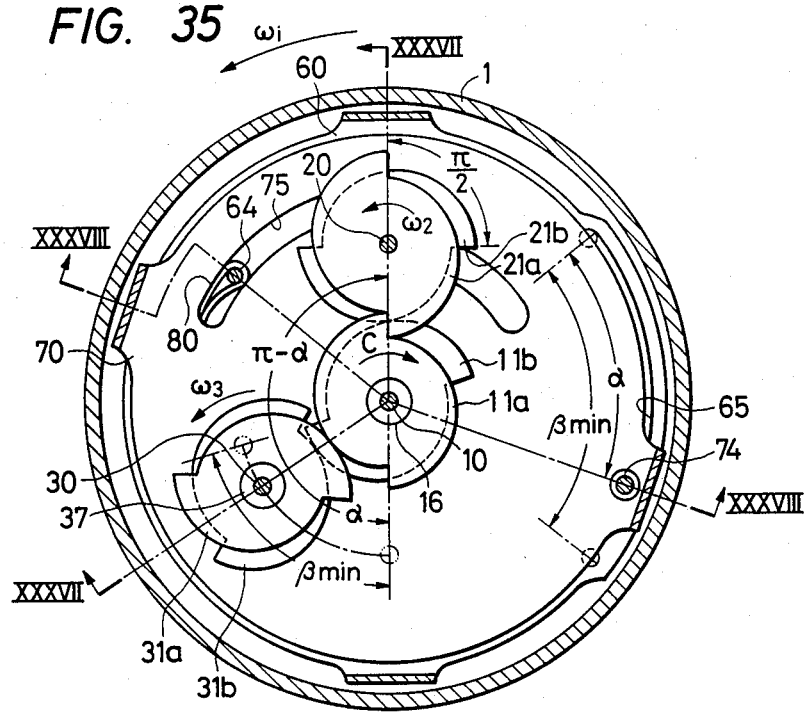
FIGS. 35 to 38 show a still further embodiment of the present invention.
Figure 36:
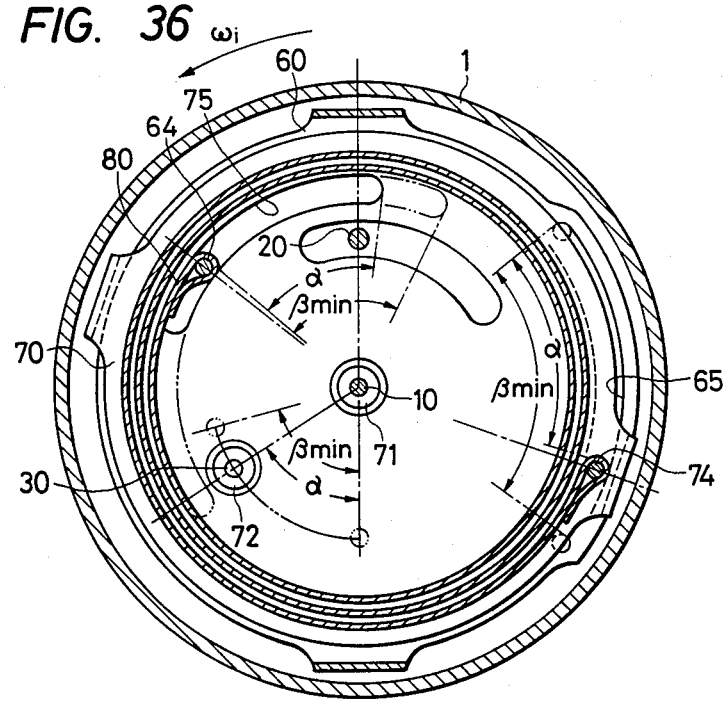
Figure 37:
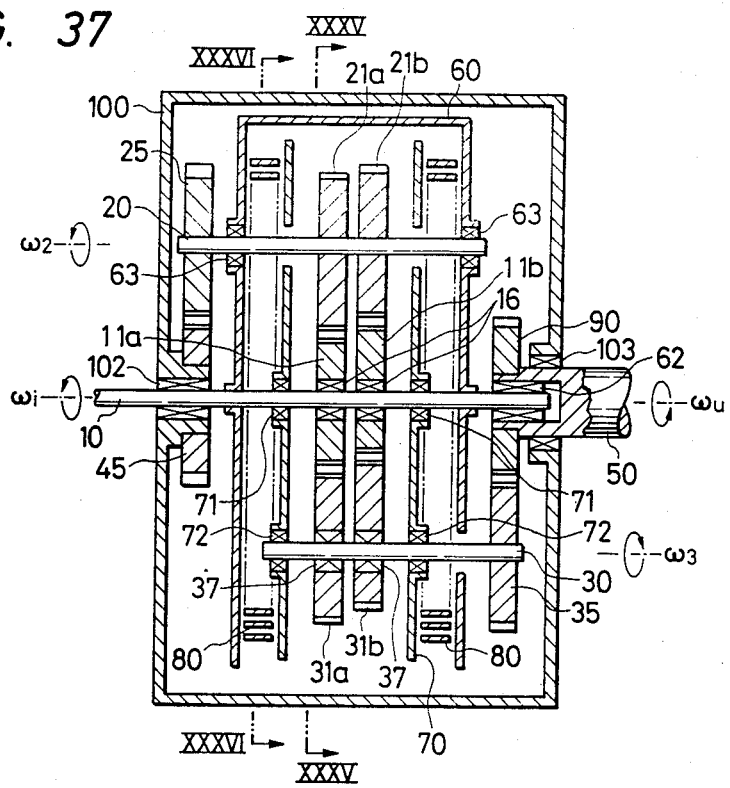
Figure 38:
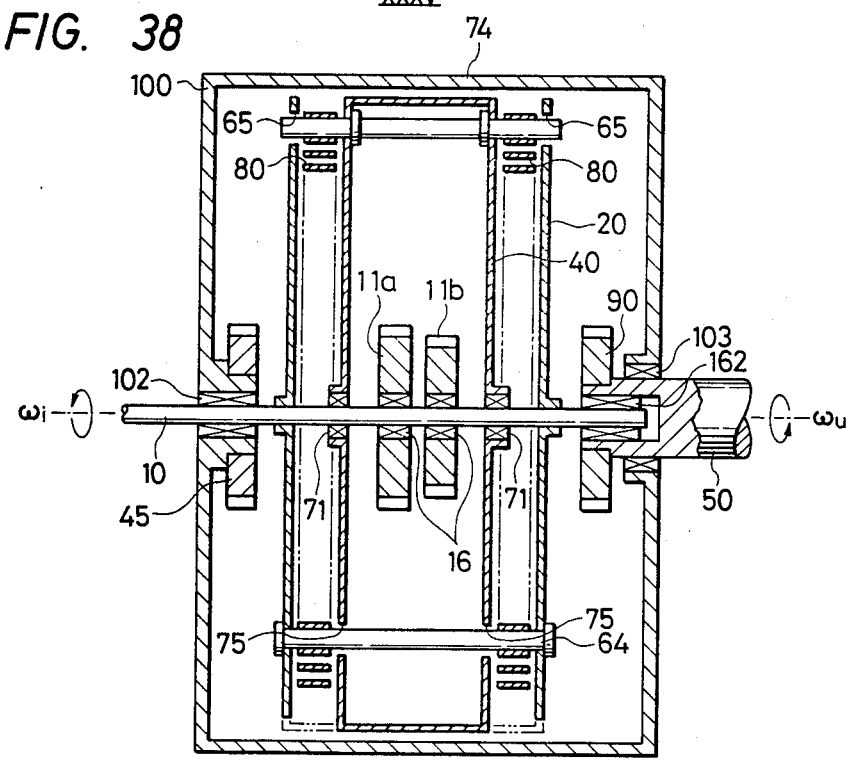

FIGS. 34a, 34b and 34c are graphs showing various characteristics of the embodiment in FIGS. 29 to 32, in which FIG. 34a shows a rotational velocity ratio of input shaft/output shaft, FIG. 34b shows a relation between torsion torque of the spring 80 and control angle $\alpha$ and FIG. 34c shows a relation between the rotational velocity ratio and output torque, respectively, when the fourth shaft 40 and the fifth shaft 50 are used as the input and output shafts, respectively, and ratios of teeth number between the gears 45 and 25 and between the gears 25 and 35 are set as 1:1 and 3:1, respectively.

Figure 39:
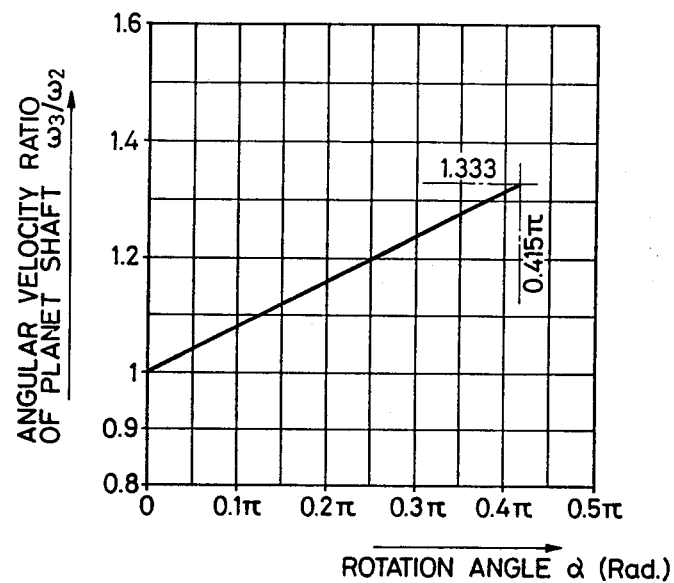
FIG. 39 is a graph showing a partial characteristics of the embodiment in FIGS. 35 to 38.
Figure 40:
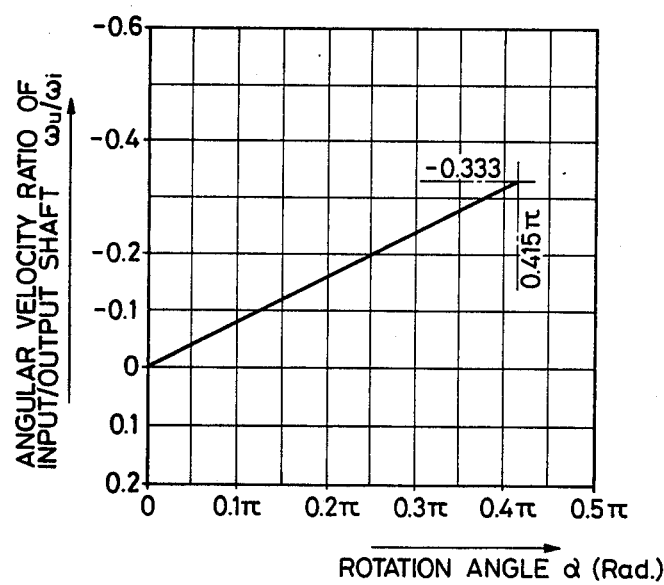
FIG. 40 is a graph showing an input/output shaft angular velocity ratio of the embodiment in FIGS. 35 to 38.

FIGS. 35 to 38 are similar to FIGS. 29 to 32 and show another embodiment of the present invention. This embodiment is different from that shown in FIGS. 29 to 32 in that the circular gear 45 is fixed on a casing 100, the non-circular gear 11a is supported on the shaft 10 through a bearing 16 and the circular gear 55 is substituted by a circular gear 90. The $\omega_3/\omega_2$ characteristics curve of this embodiment is shown in FIG. 39 and the $\omega_u/\omega_i$ characteristics curve is shown in FIG. 40. When the teeth ratio between the gears 45 and 25 and between the gears 90 and 35 are 1:1 commonly, the angular velocities of the respective elements becomes as shown in the following table.

| Condition | Angular Velocity (unit: rad/sec) | | | | |
|---|---|---|---|---|---|
| | Element | | | | |
| | Gear 45 | Gear 25 | Input Shaft 10 | Gear 35 | Output shaft 50 |
| Shaft 10 fixed | −1 | +1 | 0 | $+e^{K\cdot\alpha}$ | $-e^{K\cdot\alpha}$ |
| Casing 100 fixed | +1 | +1 | +1 | +1 | +1 |
| Summation | 0 | +2 | +1 | $+e^{K\cdot\alpha}+1$ | $-(e^{K\cdot\alpha}-1)$ |
| | | | | $\omega_i$ | $\omega_u$ |

Figure 41:
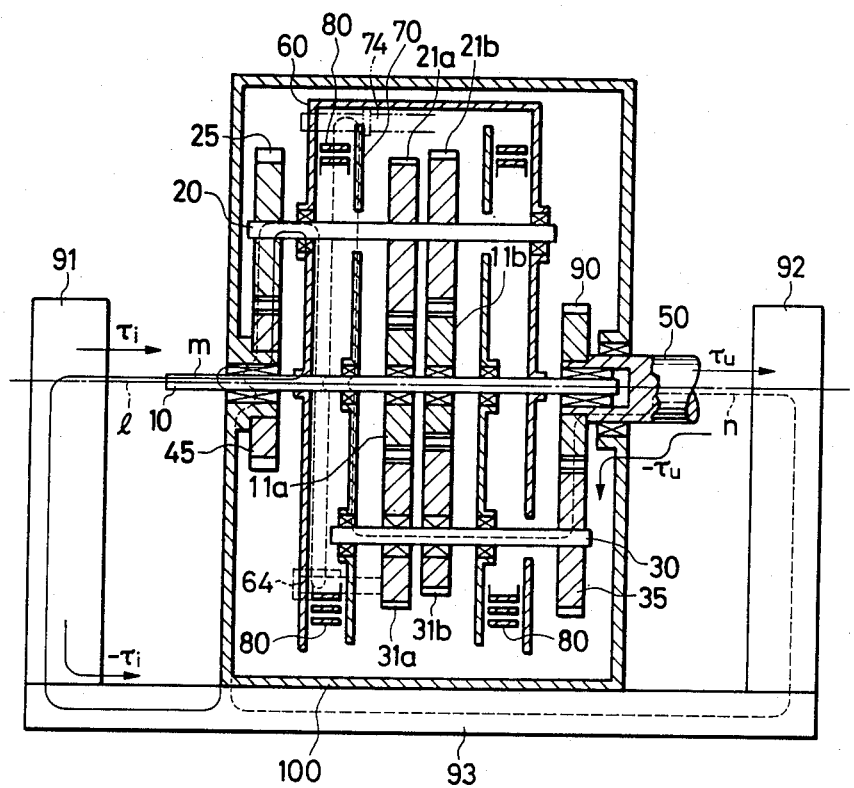
FIG. 41 illustrates a torque balance in the embodiment in FIGS. 35 to 38.

FIG. 41 illustrates the balance condition similar to FIG. 33. In FIG. 41, the input torque $\tau_i$ and the reaction torque are balanced through the input frame 60, the shaft 20, the gear 25, the gear 45 and the casing 100 and the output torque $\tau_u$ and the reaction torque $-\tau_u$ are balanced through the base 93, the casing 100, the gear 45, the gear 25, the shaft 20, the frame 70, the spring 80, the frame 70, the shaft 30, the gear 35 and 90 and the load 92.

Figure 42:
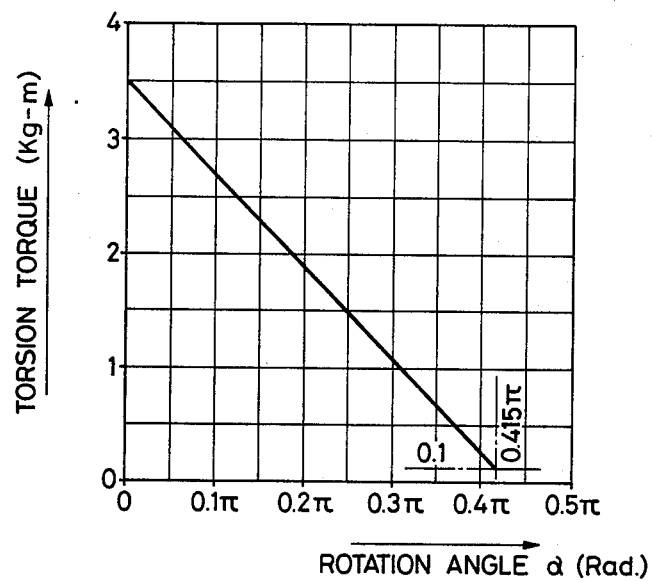
FIG. 42 is a graph showing a torsion torque characteristics of the torsion member in the last embodiment.
Figure 43:
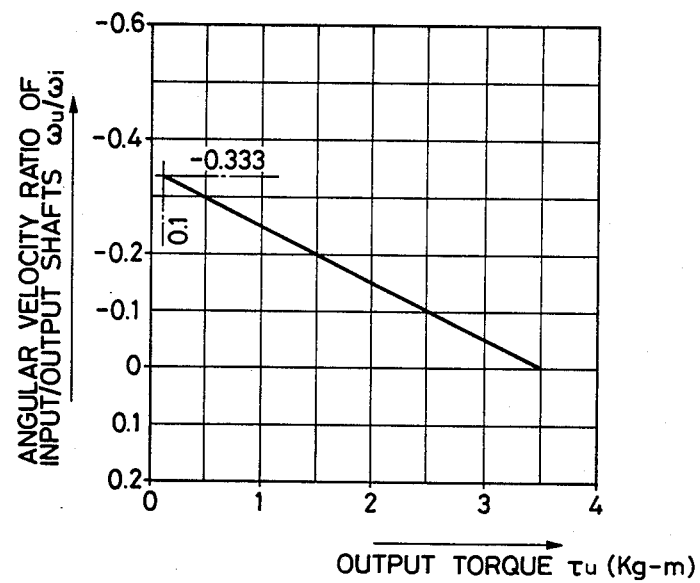
FIG. 43 is a graph showing an automatic control characteristics of the input/output shaft angular velocity ratio with the output torque.

FIGS. 42 and 43 are graphs showing a relation between the torsional torque and the angle $\alpha$ and a relation between the input/output shaft angular velocity ratio and the output torque of this embodiment.

As mentioned hereinbefore, according to the present invention, the first non-circular gear is meshed with the second non-circular gear to provide a primary angular velocity modulating means functioning to provide an exponential velocity modulation. The third non-circular gear is meshed with the first non-circular gear to provide the secondary exponential angular velocity modulating means. A relative rotation angle between the primary and secondary angular velocity modulating means can be regulated about the rotary shaft of the first non-circular gear. Thus, it becomes possible to constitute an automatic stepless transmission with a minimized number of mechanical elements. Further, with the provision of the torsion members which react the relative rotation angle directly, the input torque or the output torque is necessarily equipped with a mechanism for making the torsion torque of the torsion member to be acting thereon. Thus, the present transmission is of the direct control type and contains the automatic control function utilizing the transmission torque. The stepless transmission mechanism of the gear type having the advantages of the non-friciton type power transmission and including the automatic control function therein achieves a higher transmission efficient comparing with the conventional automatic transmission mechanism. In other words, the present stepless transmission mechanism according to the present invention the input and output shaft angular velocities can be controlled according to the load torque of the output shaft, due to the facts that the control is the direct type and that the control itself is the internal type, the present device is equipped with a completely mechanical automatic control function and a function by which the control state of the input/output shaft angular velocity ratio of 0 is maintained stably.

When the present invention is applied to, particularly, those fields such as automobile or various machine tools in which the rotational speed varies in a wide range, the present device provides a desired matching of an electric motor or an internal combustion engine whose characteristics as a prime mover is not suitable for a varying roatational speed with them, resulting in saving of energy.

What is claimed is:

1. An angular velocity modulating device comprising a primary angular velocity modulating means composed of a first non-circular gear fixedly mounted on a first rotary shaft and a second non-circular gear fixedly mounted on a second rotary shaft and meshed with said first non-circular gear for determining a primary angular velocity ratio as an angular velocity ratio of said second rotary shaft to said first rotary shaft, a secondary angular velocity modulating means composed of said first non-circular gear and a third non-circular gear supported on a third rotary shaft such that a power is transmitted therethrough to said third rotary shaft, said third non-circular gear being meshed with said first non-circular gear, said secondary angular velocity modulating means functioning to determine a secondary angular velocity ratio as an angular velocity ratio of said third rotary shaft to said first rotary shaft, a first frame for supporting said first rotary shaft and said second rotary shaft through bearings, respectively, and a second frame for supporting said third rotary shaft through bearings, said second frame being supported by said first rotary shaft rotatably about said first rotary shaft with respect to said first frame, said primary angular velocity ratio being expressed by an exponential function $e^{K\cdot\theta}\cdot F(0)$ where K is an angular velocity modulating coefficient presettable arbitrarily, F(0) is a reference angular velocity ratio presettable arbitrarily and $\theta$ is an angular deviation of said first rotary shaft, said secondary angular velocity ratio being expressed by an exponential function $e^{K\cdot(\theta+\alpha)}\cdot F(0)$ where $\alpha$ is an angle arbitrarily selectable by regulating a relative rotational amount between said first frame and said second frame, whereby an angular velocity ratio of said third rotary shaft to said second rotary shaft is obtained as a result of division of said secondary angular velocity ratio by said primary angular velocity ratio, expressed by an exponential function $e^{K\cdot\alpha}$.

2. The angular velocity modulating device as claimed in claim 1, wherein said first non-circular gear comprises a pair of non-circular, identical gear portions fixedly mounted on said first rotary shaft with a deviation angle of $\pi$ radians to each other, one of said non-circular gear portions being meshed with said second non-circular gear and the other of said non-circular gear portions being meshed with said third non-circular gear.

3. A stepless automatic transmission comprising a plurality of angular velocity modulating devices each comprising a primary angular velocity modulating means composed of a first non-circular gear fixedly mounted on a first rotary shaft and a second non-circular gear fixedly mounted on a second rotary shaft and meshed with said first non-circular gear for determining a primary angular velocity ratio as an angular velocity ratio of said second rotary shaft to said first rotary shaft, a secondary angular velocity modulating means composed of said first non-circular gear and a third non-circular gear supported on a third rotary shaft such that a power is transmitted therethrough to said third rotary shaft, said third non-circular gear being meshed with said first non-circular gear, said secondary angular velocity modulating means functioning to determine a secondary angular velocity ratio as an angular velocity ratio of said third rotary shaft to said first rotary shaft, a first frame for supporting said first rotary shaft and said second rotary shaft through bearings, respectively, and a second frame for supporting said third rotary shaft through bearings, said second frame being supported by said first rotary shaft rotatably about said first rotary shaft with respect to said first frame, said primary angular velocity ratio being expressed by an exponential function $e^{K\cdot\theta}\cdot F(0)$ where K is an angular modulating coefficient presettable arbitrarily, F(0) is a reference angular velocity ratio presettable arbitrarily and $\theta$ is an angular deviation of said first rotary shaft, said secondary angular velocity ratio being expressed by an exponential function $e^{K\cdot(\theta+\alpha)}\cdot F(0)$ where $\alpha$ is an angle arbitrarily selectable by regulating a relative rotational amount between said first frame and said second frame, whereby an angular velocity ratio of said third rotary shaft to said second rotary shaft is obtained as a result of division of said secondary angular velocity ratio by said primary angular velocity ratio, expressed by an exponential function $e^{K\cdot\alpha}$, said angular velocity modulating device being combined with said first frame and said second frame used commonly, and a torsional resilient member arranged between said first frame and said second frame for providing a torsional torque correlated to said angle, said torque being opposite in direction to an input torque or an output torque of said transmission.

4. The stepless automatic transmission as claimed in claim 3, wherein said torsional resilient member comprises a spiral spring.

5. The stepless automatic transmission as claimed in claim 3 or 4, wherein said first frame is stationary.

6. The stepless automatic transmission as claimed in claim 3 or 4, wherein said second frame is stationary.

7. A stepless automatic transmission comprising a step less transmission means including a plurality of angular velocity modulating devices, an input shaft supported rotatably by an outer casing fixedly mounted on a support member, an input frame mounted on said input shaft rotatably therewith, an input planet shaft supported by said input frame rotatably on its axis, an output frame supported by said input shaft rotatably relative to said input frame, an output planet shaft rotatably supported by said output frame, a primary angular velocity modulating means composed of a pair of non-circular gears having an exponentially, periodically varying angular velocity ratio and a secondary angular velocity modulating means composed of a pair of non-circular gears having an exponentially, periodically varying angular velocity ratio, said stepless transmission means capable of setting a ratio of an angular velocity of said output planet shaft to that of said input planet shaft to a value expressed by an exponential function $e^{K\cdot a}$ wherein a is a rotation angel determined by a relative rotational position of said input frame and said output frame and K is an angular velocity modulation coefficient inherent to said non-circular gear pairs and presettable arbitrarily, a stationary input center gear fixedly mounted on said outer casing coaxially with said input shaft, an input planet gear fixedly mounted on said input planet shaft and meshed with said input center gear, an output center gear meshed with said output planet gear and fixedly mounted on an output shaft, said output shaft being supported rotatably by said outer casing coaxially with said input shaft, and a torsional resilient member mounted between said input frame and said output frame for exerting a torsional torque to said frames.

8. The stepless automatic transmission as claimed in claim 7, wherein said torsional resilient member is a spiral spring.

* * * * *